(Model.)

S. MILES & C. EDDY.
HARVESTER.

No. 246,331. Patented Aug. 30, 1881.

WITNESSES
Fred. G. Dieterich
P. H. Dieterich

INVENTORS
Samuel Miles and Chas. Eddy,
By their Attorneys
C. A. Snow and Co.

UNITED STATES PATENT OFFICE.

SAMUEL MILES AND CHARLES EDDY, OF CLEAR LAKE, IOWA.

HARVESTER.

SPECIFICATION forming part of Letters Patent No. 246,331, dated August 30, 1881.

Application filed May 12, 1881. (Model.)

*To all whom it may concern:*

Be it known that we, SAMUEL MILES and CHARLES EDDY, of Clear Lake, in the county of Cerro Gordo and State of Iowa, have invented certain new and useful Improvements in Harvesters; and we do hereby declare that the following is a full, clear, and exact description of the invention, which will enable others skilled in the art to which it appertains to make and use the same, reference being had to the accompanying drawings, which form a part of this specification.

The object of this invention is to improve the operation and efficiency of grain-harvesters; and it consists in the construction and arrangement of parts as hereinafter more fully described, and specifically pointed out in the claims.

Figure 1:
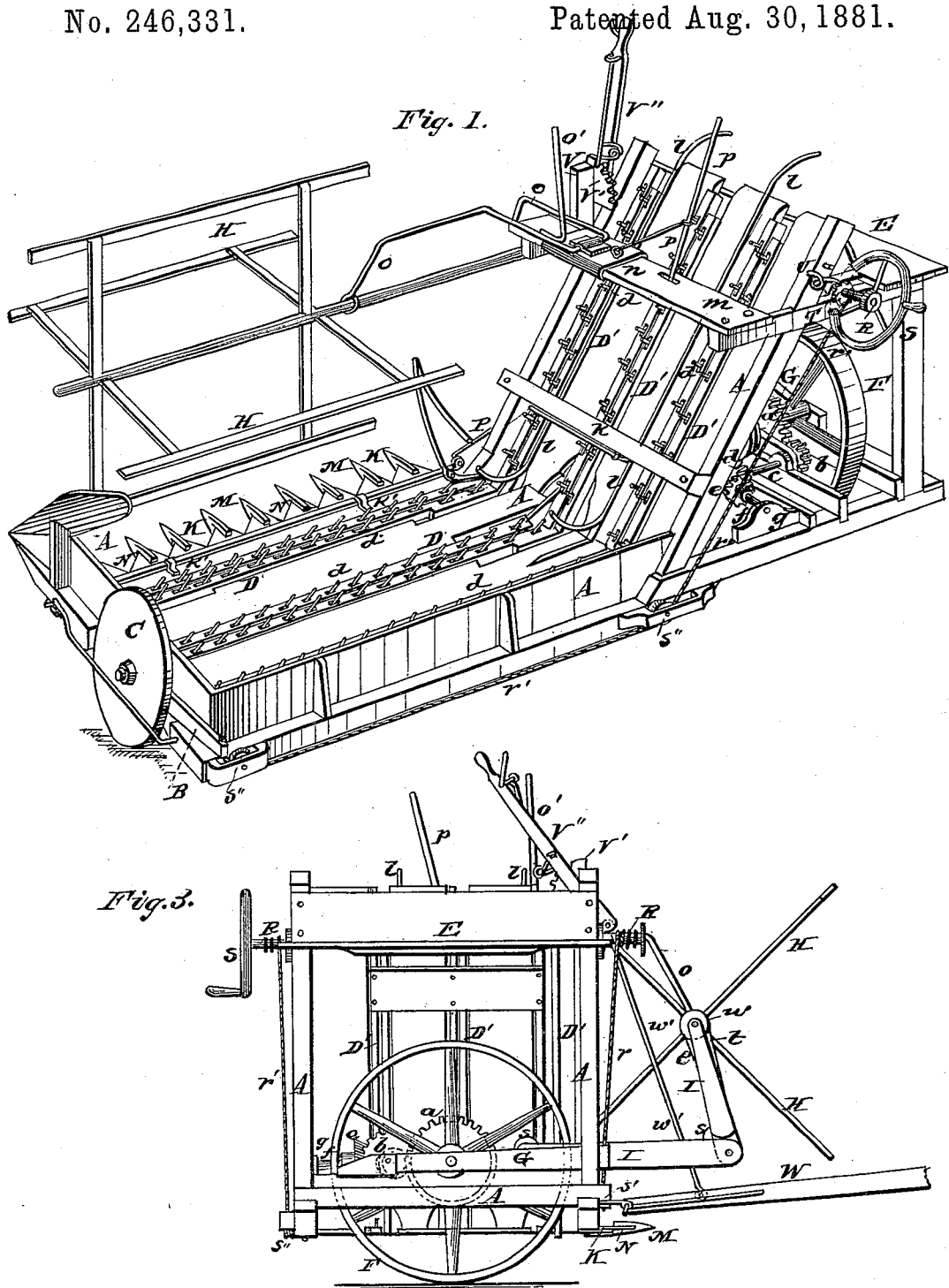
Figure 2:
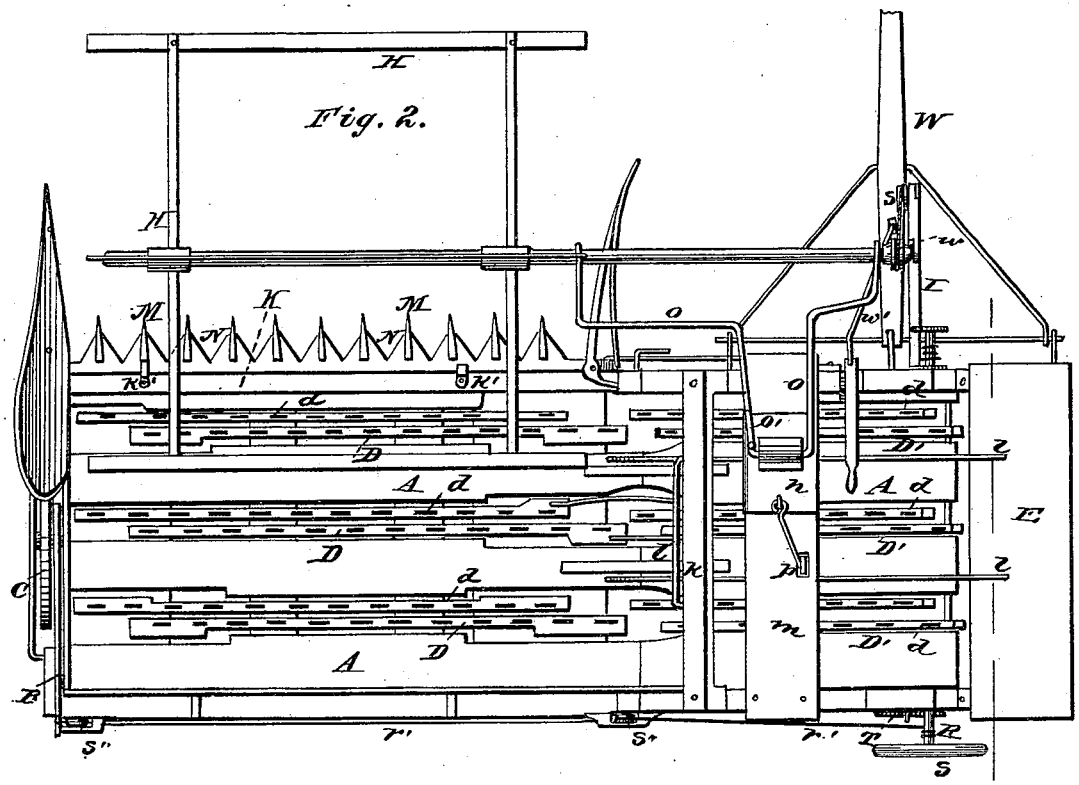
Figure 4:
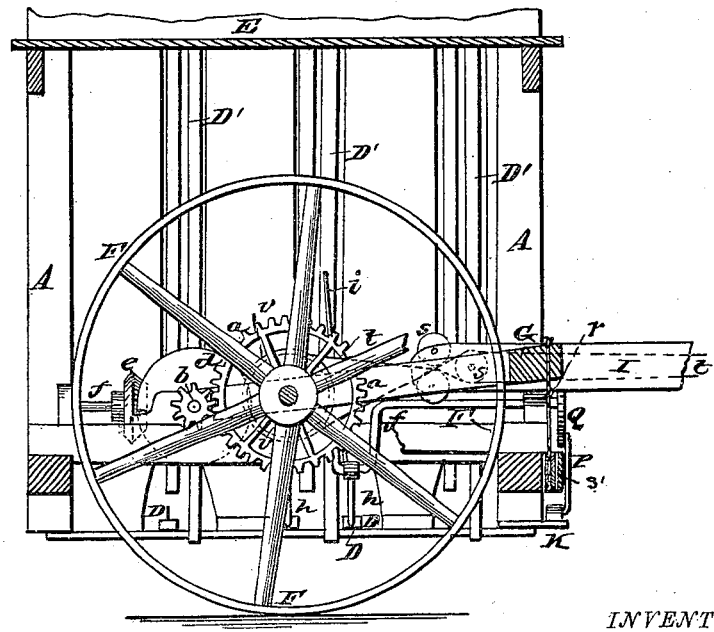

In the annexed drawings, which fully illustrate the invention, Figure 1 is a perspective. Fig. 2 is a plan. Fig. 3 is an end view, and Fig. 4 is a vertical section, through that end of the machine upon which the binders' table is located.

Like letters indicate like parts in the several views.

A represents the harvester-frame, at one side of which is pivoted a movable arm, B, that forms a bearing for the grain-wheel C. The frame A supports the horizontal rakes D and inclined rakes D', which are arranged in pairs and reciprocate in opposite directions. The bars of these rakes are slotted and provided with vibrating teeth $d$, loosely pivoted in said slots in such a manner as to maintain an erect position in carrying the grain up to the binding-table E and then fall while passing back under the grain. In this way the grain is constantly fed without interruption.

Beneath the inclined platform and binding-table is the driving-wheel F, which has its bearings in a pivoted frame, G. On the shaft of the driving-wheel, at its inner side, is a gear-wheel, $a$, which engages with a pinion, $b$, on a shaft, $c$, that is journaled in suitable bearings and carries at its inner end a miter-gear, $d$, which actuates a pinion, $e$, on the double crank-shaft $f$, which is journaled in bearings $g$ $g$ on the main harvester-frame.

To the crank-shaft $f$ are attached levers or connecting-rods $h$ $h$, which are secured to the horizontal rakes D D and actuate the same, the said rakes being alternately connected beneath the inclined platform by suitable cross-pieces in such a manner that the rakes in each pair reciprocate in opposite directions, as before mentioned. The inclined rakes D' D' are connected by similar cross-pieces in the same manner, and are actuated by levers $i$ $i$ pivoted to the levers $h$ $h$.

Attached to a cross-piece, $k$, above the inclined platform, is a guard-frame, $l$, the lower ends of which are curved upward and assist in conveying the grain by catching such as may fall back and retaining it for the further action of the rakes.

Above the inclined platform, and supported by the projecting beams of the binding-table E, is a cross-piece, $m$, which supports a sliding plate, $n$, to which are pivoted the supporting-arms $o$ $o$ of the reel H. These arms are provided with a lever, $o'$, by which the reel may be raised or lowered, and a lever, $p$, connected with the sliding plate $n$, is also provided, by means of which the plate $n$ may be adjusted forward or back, so as to correspondingly change the position of the reel when desired.

The shaft of the reel H is connected with the pivoted frame G of the driving-wheel F by the pivoted levers or connecting-rods I I, to which are secured suitable pulleys, $s$ $s$, for the attachment of a rope or chain, $t$, that passes from a large pulley, $v$, on the shaft of the driving-wheel to a pulley, $w$, on the end of the reel-shaft, and by means of which the reel is operated.

At the front of the horizontal platform is attached a metal finger-bar, K, which is provided on its upper edge with guides $k'$ $k'$, while to its lower surface are secured the fixed knife-guards M, that are slotted for the reception of the cutter-bar N, which is actuated by the pitman P, attached to a crank-wheel, Q, on the end of the crank-shaft $f$.

Beneath the upper end of the inclined platform is a revolving shaft, R, from the forward end of which extends a rope or chain, $r$, that passes around a pulley, $s'$, on the main harvester-frame, and connects with the forward end of the frame G. At the rear end of the shaft R is attached a crank-wheel, S, and a rope or chain, $r'$, that passes beneath pulleys $s''$ $s''$ at the rear of the harvester-frame and is secured to the end of the movable arm B. The shaft R also carries a ratchet-wheel, T, that engages with a pawl, U, by means of which the shaft R may be held, so as to give the required tension to the ropes or chains $r\ r'$.

To a short standard, V, at the front upper end of the inclined platform, is attached a segmental rack, V', and a spring-pawl lever, V", that engages therewith, the lower end of this lever being connected by a rod, $w'$, with the adjustable tongue or pole W, which may thus be drawn up or lowered, so as to raise or depress the forward part of the harvester-frame and cause the cutters to sever the grain at the desired distance from the ground.

It will be observed that the operative mechanism of the rakes, cutters, and reel is entirely located at one end of the machine, and, as there are thus no cranks or gearing under the horizontal platform, the frame of the machine may rest much nearer the ground than is usual with most harvesters. The finger-bar being composed entirely of metal is less bulky and possesses greater strength than is possible with such bars when composed of wood. The machine may thus be run nearer the ground, enabling it to have a more efficient operation, especially cutting fallen or trampled-down grain.

By means of the levers $o'\ p$, pawl-lever V", and crank-wheel S, which are all within easy reach of the driver, the various adjustments required may be readily made, whether the machine is at rest or in motion, and the regular and gentle operation of the reel, cutters, and rakes is such that there will be much less than the usual waste that results from the beating or thrashing movements of many harvesters.

Having thus described our invention, what we claim as new, and desire to secure by Letters Patent, is—

1. In a harvester, the combination, with the frame A and cross-piece $m$, of the reel H, arms $o\ o$, plate $n$, and levers $o'\ p$, substantially as shown and described.

2. In a harvester, the combination, with the frames A G, cross-piece $m$, reel H, and arms $o\ o$, plate $n$, and levers $o'\ p$, of the levers I I, pulleys $s\ v\ w$, chain $t$, and shaft of the driving-wheel F, substantially as shown and described.

In testimony that we claim the foregoing as our own we have hereto affixed our signatures in presence of two witnesses.

SAMUEL MILES.
CHARLES EDDY.

Witnesses:
A. Z. PHILLIPS,
THOMAS CALLUMN.